United States Patent [19]

Wollenberg

[11] Patent Number: 4,670,170

[45] Date of Patent: Jun. 2, 1987

[54] MODIFIED SUCCINIMIDES (VIII)

[75] Inventor: Robert H. Wollenberg, San Rafael, Calif.

[73] Assignee: Chevron Research Company, San Francisco, Calif.

[21] Appl. No.: 853,499

[22] Filed: Apr. 18, 1986

Related U.S. Application Data

[62] Division of Ser. No. 722,908, Apr. 12, 1985, Pat. No. 4,609,378.

[51] Int. Cl.$^4$ ........................................... C10M 145/14
[52] U.S. Cl. ................................. 252/47.5; 252/51.5 A
[58] Field of Search .................... 44/63, 71, 72, 57; 252/392, 47.5, 51.5 A; 548/546

[56] References Cited

U.S. PATENT DOCUMENTS

| | | | |
|---|---|---|---|
| 2,547,494 | 12/1949 | Rowland | 260/326.5 |
| 2,802,022 | 8/1957 | Groszos et al. | 260/471 |
| 2,991,162 | 7/1961 | Malec | 44/58 |
| 3,216,936 | 11/1965 | Le Suer | 252/32.7 |
| 3,301,784 | 1/1967 | Anderson | 252/51.5 |
| 3,367,943 | 2/1968 | Miller et al. | 260/326.3 |
| 3,373,111 | 3/1968 | Le Suer et al. | 252/51.5 |
| 3,443,918 | 5/1969 | Kautsky et al. | 44/71 |
| 3,445,386 | 5/1969 | Otto et al. | 44/71 |
| 3,497,334 | 2/1970 | Gee et al. | 44/71 |
| 3,541,012 | 11/1970 | Stuebe | 44/71 |
| 4,049,564 | 9/1977 | Ryer et al. | 252/51.5 A |
| 4,115,361 | 9/1978 | Schulze et al. | 548/546 |
| 4,147,857 | 4/1979 | Waddill et al. | 548/546 |
| 4,182,715 | 1/1980 | Heiba et al. | 260/326.5 FL |
| 4,325,827 | 4/1982 | Papay et al. | 252/51.5 A |
| 4,439,612 | 3/1984 | Babic | 548/546 |
| 4,460,381 | 7/1984 | Karol et al. | 44/63 |
| 4,482,464 | 11/1984 | Karol et al. | 252/51.5 A |
| 4,490,154 | 12/1984 | Sung et al. | 44/70 |
| 4,501,597 | 2/1985 | Karol et al. | 44/63 |

FOREIGN PATENT DOCUMENTS 689705  4/1953  United Kingdom .

Primary Examiner—Mrs. Y. Harris-Smith
Attorney, Agent, or Firm—S. R. LaPaglia; R. C. Gaffney; G. F. Swiss

[57] ABSTRACT

Disclosed are polyaminoalkenyl or alkyl succinimides which have been modified by treatment with a compound of the formula:

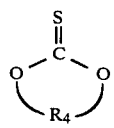

$R_4$ is an alkylene group of from 2 to 3 carbon atoms or an alkylene group of from 2 to 3 carbon atoms substituted with from 1 to 3 alkyl groups of from 1 to 2 carbon atoms each. The modified polyamino alkenyl or alkyl succinimides of this invention have been found to possess dispersancy and detergency in lubricating oils. These modified succinimides are also useful as dispersants and detergents in fuels.

30 Claims, No Drawings

MODIFIED SUCCINIMIDES (VIII)

This is a division of application Ser. No. 722,908, filed Apr. 12, 1985 now U.S. Pat. No. 4,609,378.

BACKGROUND OF THE INVENTION

1. Field of the Invention

This invention relates to additives which are useful as dispersants and/or detergents in lubricating oils. In particular, this invention is directed toward polyamino alkenyl or alkyl succinimides which have been modified by treatment with a thiocarbonate of the formula:

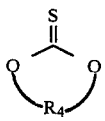

wherein $R_4$ is an alkylene group of from 2 to 3 carbon atoms or an alkylene group of from 2 to 3 carbon atoms substituted with from 1 to 3 alkyl groups of from 1 to 2 carbon atoms each. The modified polyamino alkenyl or alkyl succinimides of this invention have been found to possess dispersancy and/or detergency in lubricating oils. These modified succinimides are also useful as dispersants and/or detergents in fuels.

2. Prior Art

Alkenyl or alkyl succinimides have been previously modified with alkylene oxides to produce poly(oxyalkylene)hydroxy derivatives thereof. These alkylene oxide treated succinimides are taught as additives for lubricating oils (see U.S. Pat. Nos. 3,373,111 and 3,367,943). Karol et al, U.S. Pat. No. 4,482,464, disclose succinimides which have been modified by treatment with a hydroxyalkylene carboxylic acid selected from glycolic acid, lactic acid, 2-hydroxymethyl propionic acid and 2,2'-bis-hydroxymethylpropionic acid. These modified succinimides of Karol et al are disclosed as lubricating oil additives. Anderson, U.S. Pat. No. 3,301,784 discloses mono- and bis-(N-hydrocarbyl(alkylsubstituted)-2-pyrolidinones as dispersant additives for lubricating oils. Heiba, U.S. Pat. No. 4,182,715 discloses the reaction of gamma-alkyl-gamma butyrolactones having an alkyl substituent of at least 16 carbon atoms in length with amines or polyalkylenepolyamines. The products of this reaction are disclosed as multifunctional agents in lubricants, fuels, coolants and other organic fluids. Babic, U.S. Pat. No. 4,439,612 discloses the reaction of carbon disulfide with hydrocarbyl succinimides to form thioureas. The thioureas disclosed therein are useful in gasoline and diesel engine dispersancy, oxidation stability and friction modification. However, there is no teaching in these patents or apparently elsewhere of the modified alkenyl or alkyl succinimides of this invention.

SUMMARY OF THE INVENTION

It has now been found that polyamino alkenyl or alkyl succinimides may be modified by reaction with a thiocarbonate of Formula I:

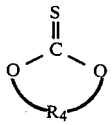

wherein $R_4$ is an alkylene group of from 2 to 3 carbon atoms or an alkylene group of from 2 to 3 carbon atoms substituted with from 1 to 3 alkyl groups of from 1 to 2 carbon atoms each.

As noted above, the modified polyamino alkenyl or alkyl succinimides of this invention possess dispersancy and/or detergency properties when used in either lubricating oils or fuels. Thus, another aspect of this invention is a lubricating oil composition comprising a major amount of an oil of lubricating viscosity and an amount of a modified polyamino alkyl or alkenyl succinimide of this invention sufficient to provide dispersancy and/or detergency.

Another aspect of this invention is a fuel composition comprising a major amount of a hydrocarbon boiling in a gasoline or diesel range and an amount of a modified polyamino alkyl or alkenyl succinimide of this invention sufficient to provide dispersancy and/or detergency.

In general, the alkenyl or alkyl group of the succinimide is from 10 to 300 carbon atoms. While the modified succinimides of this invention possess good detergency properties even for alkenyl or alkyl groups of less than 20 carbon atoms, dispersancy is enhanced when the alkenyl or alkyl group is at least 20 carbon atoms. Accordingly, in a preferred embodiment, the alkenyl or alkyl group of the succinimide is at least 20 carbon atoms.

DETAILED DESCRIPTION OF THE INVENTION

The modified polyamino alkenyl or alkyl succinimides of this invention are prepared by contacting a polyamino alkenyl or alkyl succinimide with a compound of Formula I at a temperature sufficient to cause reaction.

In particular, the reaction is conducted by contacting the compound of Formula I with the polyamino alkenyl or alkyl succinimide at a temperature sufficient to cause reaction. Reaction temperatures of from 0° C. to about 250° C. are preferred with temperatures of from about 100° C. to 200° C. being most preferred.

The reaction may be conducted neat—that is, both the alkenyl or alkyl succinimide and the compound of Formula I are combined in the proper ratio, either alone or in the presence of a catalyst, such as an acidic, basic or Lewis acid catalyst, and then stirred at the reaction temperature. Examples of suitable catalysts include, for instance, boron trifluoride, alkyl or aryl sulfonic acid, alkali or alkaline carbonate.

Alternatively, the reaction may be conducted in a diluent. For example, the reactants may be combined in a solvent such as toluene, xylene, oil or the like, and then stirred at the reaction temperature. After reaction completion, volatile components may be stripped off. When a diluent is employed, it is preferably inert to the reactants and products formed and is generally used in an amount sufficient to insure efficient stirring.

Water, which can be present in the polyamino alkenyl or alkyl succinimide, may be removed from the reaction system either before or during the course of the reaction via azeotroping or distillation. After reaction completion, the system can be stripped at elevated temperatures (100° C. to 250° C.) and reduced pressures to remove any volatile components which may be present in the product.

Another embodiment of the above process is a continuous flow system in which the alkenyl or alkyl succinic anhydride and polyamine are added at the front end of the flow while the compound of Formula I is added further downstream in the system.

Mole ratios of the compound of Formula I to the basic amine nitrogen of the polyamino alkenyl or alkyl succinimide employed in this invention are generally in the range of from about 0.2 to 1 to about 5:1, although preferably from about 0.5:1 to about 2:1.

The reaction is generally complete from within 0.5 to 10 hours.

As used herein, the term "molar charge of compound of Formula I to the basic nitrogen of an alkenyl or alkyl succinimide" means that the molar charge of a compound of Formula I employed in the reaction is based upon the theoretical number of basic nitrogens contained in the succinimide. Thus, when 1 equivalent of triethylene tetraamine (TETA) is reacted with an equivalent of succinic anhydride, the resulting monosuccinimide will theoretically contain 3 basic nitrogens. Accordingly, a molar charge of 1 would require that a mole of a compound of Formula I be added for each basic nitrogen or in this case 3 moles of a compound of Formula I for each mole of monosuccinimide prepared from TETA.

A. ALKENYL OR ALKYL SUCCINIMIDES

The modified polyamino alkenyl or alkyl succinimides of this invention are prepared from a polyamino alkenyl or alkyl succinimide. In turn, these materials are prepared by reacting an alkenyl or alkyl succinic anhydride with a polyamine group as shown in reaction (2) below:

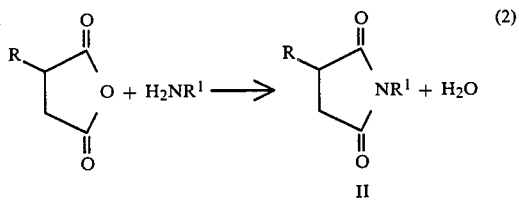

(2)

wherein R is an alkenyl or alkyl group of from 10 to 300 carbon atoms; and $R^1$ is the remainder of the polyamino moiety.

These polyamino alkenyl or alkyl succinimides that can be used herein are disclosed in numerous references and are well known in the art. Certain fundamental types of succinimides and related materials encompassed by the term of art "succinimide" are taught in U.S. Pat. Nos. 2,992,708; 3,018,291; 3,024,237; 3,100,673; 3,219,666; 3,172,892; and 3,272,746, the disclosures of which are hereby incorporated by reference. The term "succinimide" is understood in the art to include many of the amide, imide and amidine species which are also formed by this reaction. The predominant product however is succinimide and this term has been generally accepted as meaning the product of a reaction of an alkenyl substituted succinic acid or anhydride with a polyamine as shown in reaction (1) above. As used herein, included within this term are the alkenyl or alkyl mono-, bis-succinimides and other higher analogs.

A(1) Succinic Anhydride

The preparation of the alkenyl-substituted succinic anhydride by reaction with a polyolefin and maleic anhydride has been described, e.g., U.S. Pat. Nos. 3,018,250 and 3,024,195. Such methods include the thermal reaction of the polyolefin with maleic anhydride and the reaction of a halogenated polyolefin, such as a chlorinated polyolefin, with maleic anhydride. Reduction of the alkenyl-substituted succinic anhydride yields the corresponding alkyl derivative. Alternatively, the alkenyl substituted succinic anhydride may be prepared as described in U.S. Pat. Nos. 4,388,471 and 4,450,281 which are totally incorporated herein by reference.

Polyolefin polymers for reaction with the maleic anhydride are polymers comprising a major amount of $C_2$ to $C_5$ mono-olefin, e.g., ethylene, propylene, butylene, isobutylene and pentene. The polymers can be homopolymers such as polyisobutylene as well as copolymers of 2 or more such olefins such as copolymers of: ethylene and propylene, butylene, and isobutylene, etc. Other copolymers include those in which a minor amount of the copolymer monomers, e.g., 1 to 20 mole percent is a $C_4$ to $C_8$ nonconjugated diolefin, e.g., a copolymer of isobutylene and butadiene or a copolymer of ethylene, propylene and 1,4-hexadiene, etc.

The polyolefin polymer, represented in Figure II as R, usually contains from about 10 to 300 carbon atoms, although preferably 10 to 200 carbon atoms, more preferably 12 to 100 carbon atoms and most preferably 20 to 100 carbon atoms.

A particularly preferred class of olefin polymers comprises the polybutenes, which are prepared by polymerization of one or more of 1-butene, 2-butene and isobutene. Especially desirable are polybutenes containing a substantial proportion of units derived from isobutene. The polybutene may contain minor amounts of butadiene which may or may not be incorporated in the polymer. Most often the isobutene units constitute 80%, preferably at least 90%, of the units in the polymer. These polybutenes are readily available commercial materials well known to those skilled in the art. Disclosures thereof will be found, for example, in U.S. Pat. Nos. 3,215,707; 3,231,587; 3,515,669; and 3,579,450, as well as U.S. Pat. No. 3,912,764. The above are incorporated by reference for their disclosures of suitable polybutenes.

In addition to the reaction of a polyolefin with maleic anhydride, many other alkylating hydrocarbons may likewise be used with maleic anhydride to produce alkenyl succinic anhydride. Other suitable alkylating hydrocarbons include cyclic, linear, branched and internal or alpha olefins with molecular weights in the range 100–4,500 or more with molecular weights in the range of 200–2,000 being more preferred. For example, alpha olefins obtained from the thermal cracking of paraffin wax. Generally, these olefins range from 5–20 carbon atoms in length. Another source of alpha olefins is the ethylene growth process which gives even number carbon olefins. Another source of olefins is by the dimerization of alpha olefins over an appropriate catalyst such as the well known Ziegler catalyst. Internal olefins are easily obtained by the isomerization of alpha olefins over a suitable catalyst such as silica.

A(2) Polyamine

The polyamine employed to prepare the polyamino alkenyl or alkyl succinimides is preferably a polyamine having from 2 to about 12 amine nitrogen atoms and from 2 to about 40 carbon atoms. The polyamine is reacted with an alkenyl or alkyl succinic anhydride to produce the polyamino alkenyl or alkyl succinimide, employed in this invention. The polyamine is so selected so as to provide at least one basic amine per succinimide. Since the reaction of an amino nitrogen of a polyamino alkenyl or alkyl succinimide with a compound of Formula I is believed to proceed through a secondary or primary amine, at least one of the basic amine atoms of the alkenyl or alkyl succinimide must either be a primary amine or a secondary amine. Accordingly, in those instances in which the succinimide contains only one basic amine, that amine must either be a primary amine or a secondary amine. The polyamine preferably has a carbon-to-nitrogen ratio of from about 1:1 to about 10:1.

The polyamine portion of the polyamino alkenyl or alkyl succinimide may be substituted with substituents selected from (A) hydrogen, (B) hydrocarbyl groups of from 1 to about 10 carbon atoms, (C) acyl groups of from 2 to about 10 carbon atoms, and (D) monoketo, monohydroxy, mononitro, monocyano, lower alkyl and lower alkoxy derivatives of (B) and (C). "Lower", as used in terms like lower alkyl or lower alkoxy, means a group containing from 1 to about 6 carbon atoms. At least one of the substituents on one of the amines of the polyamine is hydrogen, e.g., at least one of the basic nitrogen atoms of the polyamine is a primary or secondary amino nitrogen atom.

Hydrocarbyl, as used in describing the polyamine components of this invention, denotes an organic radical composed of carbon and hydrogen which may be aliphatic, alicyclic, aromatic or combinations thereof, e.g., aralkyl. Preferably, the hydrocarbyl group will be relatively free of aliphatic unsaturation, i.e., ethylenic and acetylenic, particularly acetylenic unsaturation. The substituted polyamines of the present invention are generally, but not necessarily, N-substituted polyamines. Exemplary hydrocarbyl groups and substituted hydrocarbyl groups include alkyls such as methyl, ethyl, propyl, butyl, isobutyl, pentyl, hexyl, octyl, etc., alkenyls such as propenyl, isobutenyl, hexenyl, octenyl, etc., hydroxyalkyls, such as 2-hydroxyethyl, 3-hydroxypropyl, hydroxyisopropyl, 4-hydroxybutyl, etc., ketoalkyls, such as 2-ketopropyl, 6-ketooctyl, etc., alkoxy and lower alkenoxy alkyls, such as ethoxyethyl, ethoxypropyl, propoxyethyl, propoxypropyl, 2-(2-ethoxyethoxy)ethyl, 2-(2-(2-ethoxyethoxy)ethoxy)ethyl, 3,6,9,12-tetraoxatetradecyl, 2-(2-ethoxyethoxy)hexyl, etc. The acyl groups of the aforementioned (C) substituents are such as propionyl, acetyl, etc. The more preferred substituents are hydrogen, $C_1$–$C_6$ alkyls and $C_1$–$C_6$ hydroxyalkyls.

In a substituted polyamine the substituents are found at any atom capable of receiving them. The substituted atoms, e.g., substituted nitrogen atoms, are generally geometrically inequivalent, and consequently the substituted amines finding use in the present invention can be mixtures of mono- and polysubstituted polyamines with substituent groups situated at equivalent and/or inequivalent atoms.

The more preferred polyamine finding use within the scope of the present invention is a polyalkylene polyamine, including alkylene diamine, and including substituted polyamines, e.g., alkyl substituted polyalkylene polyamine. Preferably, the alkylene group contains from 2 to 6 carbon atoms, there being preferably from 2 to 3 carbon atoms between the nitrogen atoms. Such groups are exemplified by ethylene, 1,2-propylene, 2,2-dimethyl-propylene, trimethylene, etc. Examples of such polyamines include ethylene diamine, diethylene triamine, di(trimethylene)triamine, dipropylene triamine, triethylene tetramine, tripropylene tetramine, tetraethylene pentamine, and pentaethylene hexamine. Such amines encompass isomers such as branched-chain polyamines and the previously mentioned substituted polyamines, including hydrocarbyl-substituted polyamines. Among the polyalkylene polyamines, those containing 2–12 amine nitrogen atoms and 2–24 carbon atoms are especially preferred, and the $C_2$–$C_5$ alkylene polyamines are most preferred, in particular, the lower polyalkylene polyamines, e.g., ethylene diamine, dipropylene triamine, etc.

The polyamine component also may contain heterocyclic polyamines, heterocyclic substituted amines and substituted heterocyclic compounds, wherein the heterocycle comprises one or more 5–6 membered rings containing oxygen and/or nitrogen. Such heterocycles may be saturated or unsaturated and substituted with groups selected from the aforementioned (A), (B), (C) and (D). The heterocycles are exemplified by piperazines, such as 2-methylpiperazine, N-(2-hydroxyethyl)-piperazine, 1,2-bis-(N-piperazinyl)ethane, and N,N'-bis(N-piperazinyl)piperazine, 2-methylimidazoline, 3-aminopiperidine, 2-aminopyridine, 2-(3-aminoethyl)-3-pyrroline, 3-aminopyrrolidine, N-(3-aminopropyl)-morpholine, etc. Among the heterocyclic compounds, the piperazines are preferred.

Typical polyamines that can be used to form the compounds of this invention include the following: ethylene diamine, 1,2-propylene diamine, 1,3-propylene diamine, diethylene triamine, triethylene tetramine, hexamethylene diamine, tetraethylene pentamine, methylaminopropylene diamine, N-(betaaminoethyl)piperazine, N,N'-di(betaaminoethyl)piperazine, N,N'-di(-beta-aminoethyl)imidazolidone-2, N-(beta-cyanoethyl)ethane-1,2-diamine, 1,3,6,9-tetraaminooctadecane, 1,3,6-triamino-9-oxadecane, N-(beta-aminoethyl)diethanolamine, N-methyl-1,2-propanediamine, 2-(2-aminoethylamino)-ethanol, 2-[2-(2aminoethylamino)ethylamino]-ethanol.

Another group of suitable polyamines are the propyleneamines, (bisaminopropylethylenediamines). Propyleneamines are prepared by the reaction of acrylonitrile with an ethyleneamine, for example, an ethyleneamine having the formula $H_2N(CH_2CH_2NH)_ZH$ wherein Z is an integer from 1 to 5, followed by hydrogenation of the resultant intermediate. Thus, the product prepared from ethylene diamine and acrylonitrile would be $H_2N(CH_2)_3NH(CH_2)_2NH(CH_2)_3NH_2$.

In many instances the polyamine used as a reactant in the production of succinimides of the present invention is not a single compound but a mixture in which one or several compounds predominate with the average composition indicated. For example, tetraethylene pentamine prepared by the polymerization of aziridine or the reaction of dichloroethylene and ammonia will have both lower and higher amine members, e.g., triethylene tetramine, substituted piperazines and pentaethylene hexamine, but the composition will be largely tetraethylene pentamine and the empirical formula of the total amine composition will closely approximate that of tetraethylene pentamine. Finally, in preparing the succinimide for use in this invention, where the various nitrogen atoms of the polyamine are not geometrically equivalent, several substitutional isomers are possible and are encompassed within the final product. Methods of preparation of polyamines and their reactions are detailed in Sidgewick's "The Organic Chemistry of Nitrogen", Clarendon Press, Oxford, 1966; Noller's "Chemistry of Organic Compounds", Saunders, Philadelphia, 2nd Ed., 1957; and Kirk-Othmer's "Encyclopedia of Chemical Technology", 2nd Ed., especially Volumes 2, pp. 99–116.

The reaction of a polyamine with an alkenyl or alkyl succinic anhydride to produce the polyamino alkenyl or alkyl succinimides is well known in the art and is disclosed in U.S. Pat. Nos. 2,992,708; 3,018,291; 3,024,237; 3,100,673; 3,219,666; 3,172,892 and 3,272,746. The above are incorporated herein by reference for their disclosures of preparing alkenyl or alkyl succinimides.

As noted above, the term "polyamino alkenyl or alkyl succinimide" refers to both polyamino alkenyl or alkyl mono- and bis-succinimides and to the higher analogs of alkenyl or alkyl poly succinimides. Preparation of the bis- and higher analogs may be accomplished by controlling the molar ratio of the reagents. For example, a product comprising predominantly mono- or bis-succinimide can be prepared by controlling the molar ratios of the polyamine and succinic anhydride. Thus, if one mole of polyamine is reacted with one mole of an alkenyl or alkyl substituted succinic anhydride, a predominantly mono-succinimide product will be prepared. If two moles of an alkenyl or alkyl substituted succinic anhydride are reacted per mole of polyamine, a bis-succinimide is prepared. Higher analogs may likewise be prepared.

A particularly preferred class of polyamino alkenyl or alkyl succinimides employed in the process of the instant invention may be represented by Formula II:

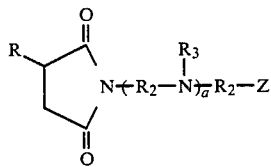

III wherein R is alkenyl or alkyl of from 10 to 300 carbon atoms; $R_2$ is alkylene of 2 to 10 carbon atoms; $R_3$ is hydrogen, lower alkyl or lower hydroxy alkyl; a is an integer from 0 to 10; and Z is $-NH_2$ or represents a group of Formula IV:

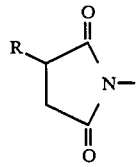

IV wherein R is alkenyl or alkyl of from 10 to 300 carbon atoms; with the proviso that when Z is the group of Formula IV above, then a is not zero and at least one of $R_3$ is hydrogen.

As indicated above, the polyamine employed in preparing the succinimide is often a mixture of different compounds having an average composition indicated as the Formula III. Accordingly, in Formula III each value of $R_2$ and $R_3$ may be the same as or different from other $R_2$ and $R_3$.

Preferably R is alkenyl or alkyl is preferably 10 to 200 carbon atoms and most preferably 20 to 100 carbon atoms.

Preferably $R_2$ is alkylene of 2 to 6 carbon atoms and most preferably is either ethylene or propylene.

Preferably, $R_3$ is hydrogen.

Preferably, a is an integer from 1 to 6.

In formula III, the polyamino alkenyl or alkyl succinimides may be conveniently viewed as being composed of three moieties that is the alkenyl or alkyl moiety R, the succinimide moiety represented by the formula:

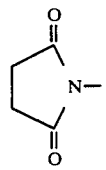

and the polyamino moiety represented by the group

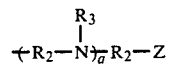

The alkylene polyamines employed in this reaction are generally represented by the formula:

wherein $R_2$ is an alkylene moiety of 2 to 10 carbon atoms and a is an integer from about 0 to 10. However, the preparation of these alkylene polyamines do not produce a single compound and cyclic heterocycles, such as piperazine, may be included to some extent in the alkylene diamines.

B. Compounds of Formula I

The thiocarbonates, I, of this invention react with a basic primary or secondary amine of the polyamino moiety, V, to form thiocarbamates VI, and amines, VII, as shown in reaction (2) below:

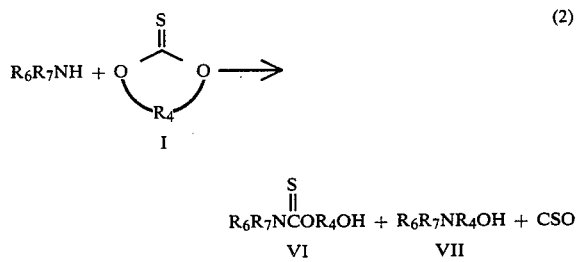

wherein $R_4$, $R_6$, and $R_7$, are as defined above.

If additional thiocarbonate, I, is added to the reaction, it will react with any available primary or secondary amine. Afterward, additional thiocarbonate will react with the hydroxy group of either VI or VII to form polymers. This reaction may proceed to form this carbamate or eliminate CSO and form polyoxyalkylene compounds. Preferably, a molar charge of from 0.2:1 to 5:1 of carbamate, XVI, to the basic nitrogen of the polyamino moiety of the alkenyl or alkyl succinimide is employed; more preferably 0.5:1 to 2:1.

Accordingly, another aspect of this invention is a product produced by the process which comprises contacting a polyamino alkenyl or alkyl succinimide with a compound of Formula I at a temperature sufficient to cause reaction.

The following are examples of suitable cyclic carbonates for use in this invention: 1,3-dioxolan-2-thione(ethylenethiocarbonate); 4-methyl-1,3-dioxolan-2-thione(-propylenethiocarbonate) and the like.

Cyclic thiocarbonates of Formula I may be readily prepared by known reactions. For example, reaction of thiophosgene with a suitable alpha alkane diol or an alkan-1,3-diol yields a thiocarbonate for use within the scope of this invention (see U.S. Pat. No. 4,115,206 which is incorporated herein by reference).

Likewise, the cyclic carbonates useful for this invention may be prepared by transesterifiction of a suitable alpha alkane diol or an alkan-1,3-diol with, e.g., diethyl thiocarbonate under transesterification conditions. (See, for instance, U.S. Pat. Nos. 4,384,115 and 4,423,205).

Lastly, thiocarbonates of Formula I may be prepared as in Synthesis Vol. 4, 286 (1978) and Journal of Organic Chemistry, 34, 3011 (1969).

As used herein, the term "alpha alkane diol" means an alkane group having two hydroxyl substituents wherein the hydroxyl substituents are on adjacent carbons to each other. Examples of alpha alkane diols include 1,2-propanediol, 2,3-butanediol and the like.

The term "alkan-1,3-diol" means an alkane group having two hydroxyl substituents wherein the hydroxyl substituents are beta substituted. That is, there is a methylene or a substituted methylene moiety between the hydroxyl substituted carbons. Examples of alkan-1,3-diols include propan-1,3-diol, pentan-2,4-diol and the like.

The alpha alkane diols, used to prepare the 1,3-dioxolan-2-thiones employed in this invention, are either commercially available or may be prepared from the corresponding olefin by methods known in the art. For example, the olefin may first react with a peracid, such as peroxyacetic acid or hydrogen peroxide to form the corresponding epoxide which is readily hydrolyzed under acid or base catalysis to the alpha alkane diol. In another process, the olefin is first halogenated to a dihalo derivative and subsequently hydrolyzed to an alpha alkane diol by reaction first with sodium acetate and then with sodium hydroxide. The olefins so employed are known in the art.

The alkan-1,3-diols, used to prepare the 1,3-dioxan-2-thiones employed in this invention, are either commercially available or may be prepared by standard techniques, e.g., derivatizing malonic acid.

The modified polyamino succinimide of this invention can also be reacted with boric acid or a similar boron compound to form borated dispersants having utility within the scope of this invention. In addition to boric acid (boron acid), examples of suitable boron compounds include boron oxides, boron halides and esters of boric acid. Generally from about 0.1 equivalents to 10 equivalents of boron compound to the modified succinimide may be employed.

The modified polyamino alkenyl or alkyl succinimides of this invention are useful as detergent and dispersant additives when employed in lubricating oils. When employed in this manner, the modified polyamino alkenyl or alkyl succinimide additive is usually present in from 0.2 to 10 percent by weight to the total composition and preferably at about 0.5 to 5 percent by weight. The lubricating oil used with the additive compositions of this invention may be mineral oil or synthetic oils of lubricating viscosity and preferably suitable for use in the crankcase of an internal combustion engine. Crankcase lubricating oils ordinarily have a viscosity of about 1300 CSt 0° F. to 22.7 CSt at 210° F. (99° C.). The lubricating oils may be derived from synthetic or natural sources. Mineral oil for use as the base oil in this invention includes paraffinic, naphthenic and other oils that are ordinarily used in lubricating oil compositions. Synthetic oils include both hydrocarbon synthetic oils and synthetic esters. Useful synthetic hydrocarbon oils include liquid polymers of alpha olefins having the proper viscosity. Especially useful are the hydrogenated liquid oligomers of $C_6$ to $C_{12}$ alpha olefins such as 1-decene trimer. Likewise, alkyl benzenes of proper viscosity such as didodecyl benzene, can be used. Useful synthetic esters include the esters of both monocarboxylic acid and polycarboxylic acids as well as monohydroxy alkanols and polyols. Typical examples are didodecyl adipate, pentaerythritol tetracaproate, di-2-ethylhexyl adipate, dilaurylsebacate and the like. Complex esters prepared from mixtures of mono and dicarboxylic acid and mono and dihydroxy alkanols can also be used.

Blends of hydrocarbon oils with synthetic oils are also useful. For example, blends of 10 to 25 weight percent hydrogenated 1-decene trimer with 75 to 90 weight percent 150 SUS (100° F.) mineral oil gives an excellent lubricating oil base.

Additive concentrates are also included within the scope of this invention. The concentrates of this invention usually include from about 90 to 10 weight percent of an oil of lubricating viscosity and from about 10 to 90 weight percent of the complex additive of this invention. Typically, the concentrates contain sufficient diluent to make them easy to handle during shipping and storage. Suitable diluents for the concentrates include any inert diluent, preferably an oil of lubricating viscosity, so that the concentrate may be readily mixed with lubricating oils to prepare lubricating oil compositions. Suitable lubricating oils which can be used as diluents typically have viscosities in the range from about 35 to about 500 Saybolt Universal Seconds (SUS) at 100° F. (38° C.), although an oil of lubricating viscosity may be used.

Other additives which may be present in the formulation include rust inhibitors, foam inhibitors, corrosion inhibitors, metal deactivators, pour point depressants, antioxidants, and a variety of other well-known additives.

It is also contemplated the modified succinimides of this invention may be employed as dispersants and detergents in hydraulic fluids, marine crankcase lubricants and the like. When so employed, the modified succinimide is added at from about 0.1 to 10 percent by weight to the oil. Preferably, at from 0.5 to 5 weight percent.

When used in fuels, the proper concentration of the additive necessary in order to achieve the desired detergency is dependent upon a variety of factors including the type of fuel used, the presence of other detergents or dispersants or other additives, etc. Generally, however, and in the preferred embodiment, the range of concentration of the additive in the base fuel is 10 to 10,000 weight parts per million, preferably from 30 to 2,000 weight parts per million, and most preferably from 30 to 70 parts per million of the modified succinimide per part of base fuel. If other detergents are present, a lesser amount of the modified succinimide may be used.

The modified succinimide additives of this invention may be formulated as a fuel concentrate, using an inert stable oleophilic organic solvent boiling in the range of about 150° to 400° F. Preferably, an aliphatic or an aromatic hydrocarbon solvent is used, such as benzene, toluene, xylene or higher-boiling aromatics or aromatic thinners. Aliphatic alcohols of about 3 to 8 carbon atoms, such as isopropanol, isobutylcarbinol, n-butanol and the like, in combination with hydrocarbon solvents are also suitable for use with the fuel additive. In the fuel concentrate, the amount of the additive will be ordinarily at least 10 percent by weight and generally not exceed 70 percent by weight and preferably from 10 to 25 weight percent.

EXAMPLES

EXAMPLE 1

To a 500-ml reaction flask is charged 253.4 g of a succinimide dispersant composition [prepared by reacting 1 mole of polyisobutenyl succinic anhydride—where the polyisobutenyl group has a number average molecular weight of 950—and 0.9 mole triethylenetetraamine and then diluting to about 50% actives with lubricating oil diluent to give a material with an alkalinity value (AV) of 47 mg KOH/g]. To this succinimide is added 26.1 g 1,3-dioxolan-2-thione. The mixture is heated to 150±5° C. for 3 hours to yield a modified succinimide of this invention.

EXAMPLE 2

To a 5-liter reaction flask is charged 2534 g of the succinimide dispersant composition of Example 1 and 30.6 g 4-methyl-1,3-dioxolan-2-thione. The reaction mixtures is stirred and heated at 150±5° C. for 9 hours to yield a modified succinimide of this invention.

What is claimed is:

1. A lubricating oil composition comprising an oil of lubricating viscosity and from 0.2 to 10 percent by weight of a product produced by the process which comprises contacting at a temperature sufficient to cause reaction a polyamino alkenyl or alkyl succinimide and a compound of Formula I

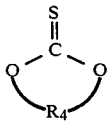

wherein $R_4$ is alkylene of from 2 to 3 carbon atoms or an alkylene group of from 2 to 3 carbon atoms substituted with from 1 to 3 alkyl groups of from 2 to 3 carbon atoms each.

2. A lubricating oil composition according to claim 1 wherein $R_4$ is alkylene of from 2 to 3 carbon atoms.

3. A lubricating oil composition according to claim 2 wherein $R_4$ is ethylene.

4. A lubricating oil composition according to claim 1 wherein the compound of Formula I is 4-methyl-1,3-dioxolan-2-thione.

5. A lubricating oil composition according to claim 1 wherein the reaction is conducted at from 0° C. to 250° C.

6. A lubricating oil composition according to claim 5 wherein the molar charge of the compound of Formula I to the basic nitrogen of the polyamino moiety of the polyamino alkenyl or alkyl succinimide is from about 0.2:1 to about 5:1.

7. A lubricating oil composition comprising an oil of lubricating viscosity and 0.2 to 10 percent by weight of a product prepared by the process which comprises contacting at a temperature sufficient to cause reaction a polyamino alkenyl or alkyl succinimide of formula III

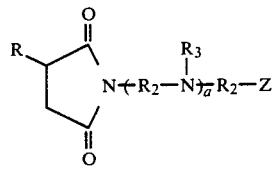

wherein R is alkenyl or alkyl of from 10 to 300 carbon atoms; $R_2$ is alkylene of 2 to 10 carbon atoms; $R_3$ is hydrogen, lower alkyl or lower hydroxy alkyl; a is an integer from 0 to 10; and Z is —$NH_2$ or

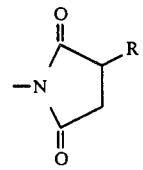

wherein R is alkenyl or alkyl or from 10 to 300 carbon atoms; with the proviso that when Z is

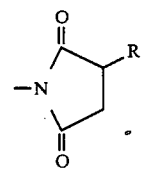

then a is not zero and at least one of $R_3$ is hydrogen; with a compound of Formula I

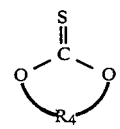

wherein $R_4$ is alkylene of from 2 to 3 carbon atoms or an alkylene group of from 2 to 3 carbon atoms substituted with from 1 to 3 alkyl groups of from 2 to 3 carbon atoms each.

8. A lubricating oil composition according to claim 7 wherein R is alkenyl or alkyl of from 20 to 100 carbon atoms.

9. A lubricating oil composition according to claim 8 wherein $R_2$ is alkylene of 2 to 6 carbon atoms.

10. A lubricating oil composition according to claim 9 wherein a is an integer from 1 to 6 and $R_3$ is hydrogen.

11. A lubricating oil composition according to claim 8 wherein $R_4$ is alkylene of from 2 to 3 carbon atoms.

12. A lubricating oil composition according to claim 11 wherein $R_4$ is ethylene.

13. A lubricating oil composition according to claim 8 wherein the compound of formula I is 4-methyl-1,3-dioxolan-2-thione.

14. A lubricating oil composition according to claim 8 wherein the reaction is conducted at from 0° to 250° C.

15. A lubricating oil composition according to claim 14 wherein the molar charge of the compound of Formula I to the basic nitrogen of the polyamino moiety of the polyamino alkenyl or alkyl succinimide is from about 0.2:1 to about 5:1.

16. A lubricating oil concentrate comprising from about 90 to 10 weight percent of an oil of lubricating viscosity and from about 10 to 90 weight percent of a product produced by the process which comprises contacting at a temperature sufficient to cause reaction a polyamino alkenyl or alkyl succinimide and a compound of Formula I

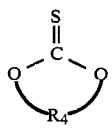
I wherein $R_4$ is alkylene of from 2 to 3 carbon atoms or an alkylene group of from 2 to 3 carbon atoms substituted with from 1 to 3 alkyl groups of from 2 to 3 carbon atoms each.

17. A lubricating oil concentrate according to claim 16 wherein $R_4$ is alkylene of from 2 to 3 carbon atoms.

18. A lubricating oil concentrate according to claim 17 wherein $R_4$ is ethylene.

19. A lubricating oil concentrate according to claim 16 wherein the compound of Formula I is 4-methyl-1,3-dioxolan-2-thione.

20. A lubricating oil concentrate according to claim 16 wherein the reaction is conducted at from 0° C. to 250° C.

21. A lubricating oil concentrate according to claim 20 wherein the molar charge of the compound of Formula I to the basic nitrogen of the polyamino moiety of the polyamino alkenyl or alkyl succinimide is from about 0.2:1 to about 5:1.

22. A lubricating oil concentrate comprising from about 90 to 10 weight percent of an oil of lubricating viscosity and from about 10 to 90 weight percent of a product prepared by the process which comprises contacting at a temperature sufficient to cause reaction a polyamino alkenyl or alkyl succinimide of formula III

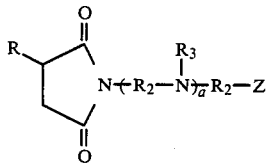
III wherein R is alkenyl or alkyl of from 10 to 300 carbon atoms; $R_2$ is alkylene of 2 to 10 carbon atoms; $R_3$ is hydrogen, lower alkyl or lower hydroxy alkyl; a is an integer from 0 to 10; and Z is —$NH_2$ or

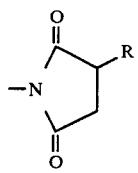

wherein R is alkenyl or alkyl of from 10 to 300 carbon atoms; with the proviso that when Z is

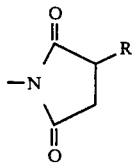

then a is not zero and at least one of $R_3$ is hydrogen; with a compound of Formula I

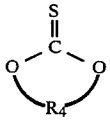
I wherein $R_4$ is alkylene of from 2 to 3 carbon atoms or an alkylene group of from 2 to 3 carbon atoms substituted with from 1 to 3 alkyl groups of from 2 to 3 carbon atoms each.

23. A lubricating oil concentrate according to claim 20 wherein R is alkenyl or alkyl of from 20 to 100 carbon atoms.

24. A lubricating oil concentrate according to claim 23 wherein $R_2$ is alkylene of 2 to 6 carbon atoms.

25. A lubricating oil concentrate according to claim 24 wherein a is an integer from 1 to 6 and $R_3$ is hydrogen.

26. A lubricating oil concentrate according to claim 23 wherein $R_4$ is alkylene of from 2 to 3 carbon atoms.

27. A lubricating oil concentrate according to claim 26 wherein $R_4$ is ethylene.

28. A lubricating oil concentrate according to claim 23 wherein the compound of Formula I is 4-methyl-1,3-dioxolan-2-thione.

29. A lubricating oil concentrate according to claim 23 wherein the reaction is conducted at from 0° to 250° C.

30. A lubricating oil concentrate according to claim 29 wherein the molar charge of the compound of Formula I to the basic nitrogen of the polyamino moiety of the polyamino alkenyl or alkyl succinimide is from about 0.2:1 to about 5:1.

* * * * *

UNITED STATES PATENT AND TRADEMARK OFFICE
CERTIFICATE OF CORRECTION

PATENT NO. : 4,670,170
DATED : June 2, 1987
INVENTOR(S) : Robert H. Wollenberg

It is certified that error appears in the above-identified patent and that said Letters Patent are hereby corrected as shown below:

Column 14, line 38 "to claim 20" should read --to claim 22--.

Signed and Sealed this

First Day of September, 1987

Attest:

DONALD J. QUIGG

*Attesting Officer*      Commissioner of Patents and Trademarks